United States Patent
Krüger

(10) Patent No.: US 9,546,088 B2
(45) Date of Patent: Jan. 17, 2017

(54) ARRANGEMENT FOR FILLING WATERING CANS

(71) Applicant: Stephan Krüger, Oldenburg (DE)

(72) Inventor: Helmut Krüger, Bergen/Dumme (DE)

(73) Assignee: Stephan Krüger, Oldenburg (DE)

( * ) Notice: Subject to any disclaimer, the term of this patent is extended or adjusted under 35 U.S.C. 154(b) by 0 days.

(21) Appl. No.: 14/297,877

(22) Filed: Jun. 6, 2014

(65) Prior Publication Data

US 2014/0366984 A1  Dec. 18, 2014

(30) Foreign Application Priority Data

Jun. 12, 2013  (DE) .................. 10 2013 009 795

(51) Int. Cl.
*B67D 7/36* (2010.01)
*A01G 25/14* (2006.01)
*E03B 3/03* (2006.01)

(52) U.S. Cl.
CPC .............. *B67D 7/365* (2013.01); *A01G 25/14* (2013.01); *E03B 3/03* (2013.01)

(58) Field of Classification Search
CPC .................................. B67D 7/30; B67D 7/365
USPC ....... 141/198, 199, 200, 201, 202, 203, 204; 47/48.5, 62 E; 222/181.1
See application file for complete search history.

(56) References Cited

U.S. PATENT DOCUMENTS

| | | | | |
|---|---|---|---|---|
| 525,232 | A * | 8/1894 | Reese | 222/157 |
| 2,737,417 | A * | 3/1956 | Gundersen | 239/377 |
| 4,006,843 | A * | 2/1977 | Martinez | 222/68 |
| 4,700,892 | A * | 10/1987 | Cunning | 239/289 |
| 5,782,412 | A * | 7/1998 | Plantz et al. | 239/197 |
| 5,915,628 | A * | 6/1999 | Kreizel | 239/377 |
| 5,961,048 | A * | 10/1999 | Prieschl et al. | 239/146 |
| 6,000,425 | A * | 12/1999 | Steinorth | 137/391 |
| 6,799,700 | B2 * | 10/2004 | Durant et al. | 222/129 |
| 7,137,223 | B1 * | 11/2006 | Purcell | 47/48.5 |
| D646,702 | S * | 10/2011 | Rose | D15/199 |
| 8,272,539 | B2 * | 9/2012 | Ophardt et al. | 222/181.1 |
| 2002/0108169 | A1 * | 8/2002 | Preciado-Villanueva | 4/378 |
| 2005/0051231 | A1 * | 3/2005 | Harding | 141/2 |
| 2006/0071039 | A1 * | 4/2006 | Bone | 222/465.1 |
| 2007/0169840 | A1 * | 7/2007 | George | 141/216 |
| 2009/0272760 | A1 * | 11/2009 | Ugone | 222/1 |
| 2010/0144236 | A1 * | 6/2010 | Asbach et al. | 446/176 |

(Continued)

FOREIGN PATENT DOCUMENTS

DE  2932909 A1  3/1981
DE  8804639 U1  6/1988

(Continued)

OTHER PUBLICATIONS

Deutsches Patent—Und Markenamt (German Patent and Trademark Office), Recherchebericht (Search on priority patent application), Feb. 11, 2014.

(Continued)

*Primary Examiner* — Mark A Laurenzi
*Assistant Examiner* — Andrew Schmid
(74) *Attorney, Agent, or Firm* — Laurence P. Colton

(57) ABSTRACT

An arrangement for filling watering cans (16), having a container (10) for receiving liquid, wherein the container is assigned a closable outlet and an in particular closable inlet. In this case, an effective cross section of the outlet may be larger than an effective cross section of the inlet.

20 Claims, 3 Drawing Sheets

(56) References Cited

U.S. PATENT DOCUMENTS

| | | | |
|---|---|---|---|
| 2010/0163641 A1* | 7/2010 | Ugone | 239/10 |
| 2010/0193046 A1* | 8/2010 | Moroder et al. | 137/357 |
| 2010/0303654 A1* | 12/2010 | Petersen et al. | 417/423.7 |
| 2011/0036924 A1* | 2/2011 | Huang | 239/198 |
| 2014/0339803 A1* | 11/2014 | Hammer | 280/830 |

FOREIGN PATENT DOCUMENTS

| | | | |
|---|---|---|---|
| GB | 2431220 A | * | 4/2007 |
| GB | 2439617 A | | 1/2008 |
| GB | 2442236 A | | 4/2008 |
| GB | 2479391 A | | 10/2011 |
| GB | 2498576 A | | 7/2013 |

OTHER PUBLICATIONS

European Patent Office, Europaischer Recherchenbericht (EPO search for related application), Oct. 13, 2014.

European Patent Office, Office Action on a related application (Oct. 5, 2015).

* cited by examiner

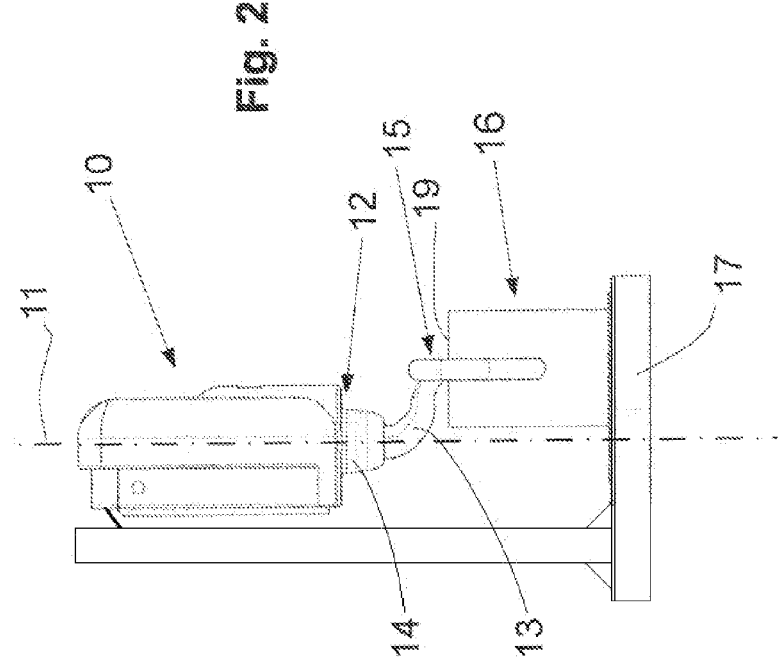
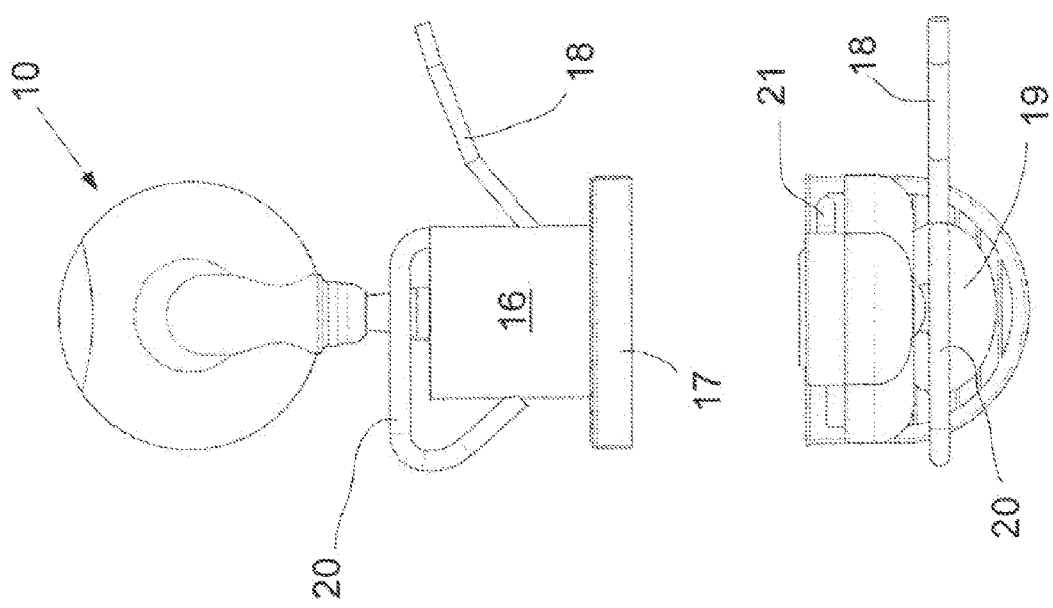

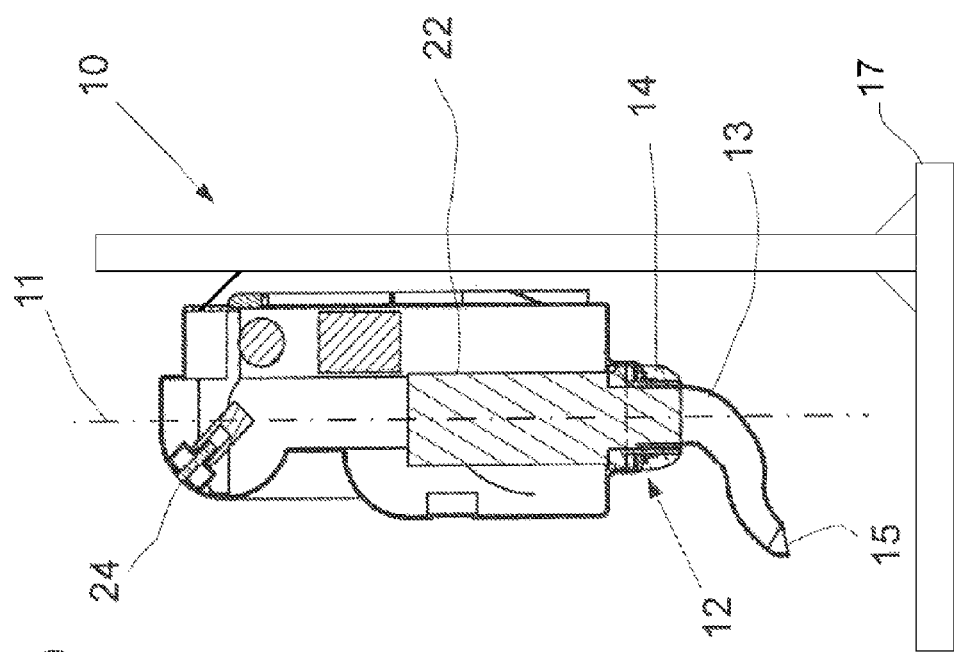
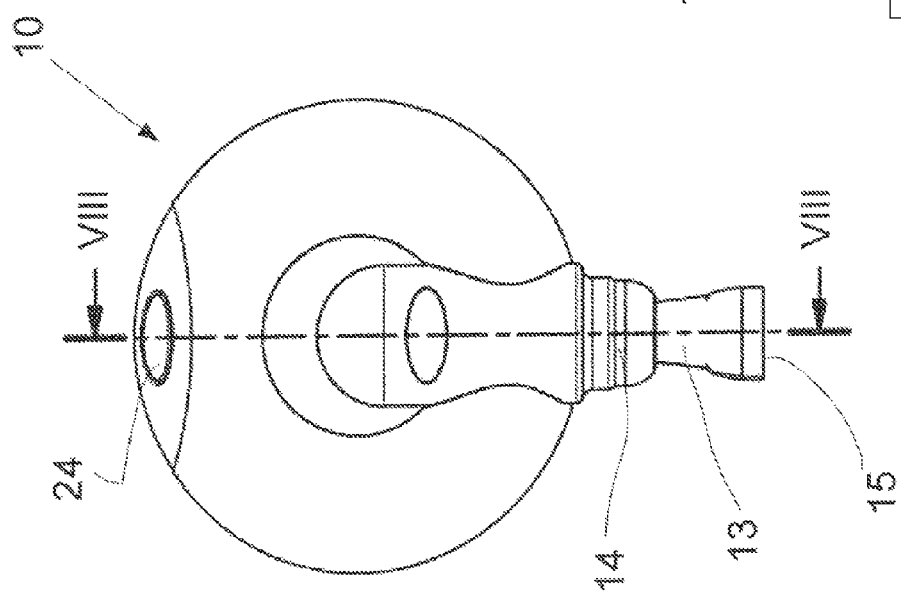

ARRANGEMENT FOR FILLING WATERING CANS

STATEMENT OF RELATED APPLICATIONS

This patent application claims priority on German Patent Application No. DE 10 2013 009 795.9 having a filing date of 12 Jun. 2013.

BACKGROUND OF THE INVENTION

1. Technical Field

The invention relates to an arrangement for filling watering cans.

2. Prior Art

Typical watering cans for use in the garden have on their top side a large filling opening and a handle which extends in a curved manner over the opening. Filling the watering can from a tap or by means of a garden hose is time-consuming and/or tedious.

BRIEF SUMMARY OF THE INVENTION

It is the object of the invention to create an arrangement for quicker or easier filling of watering cans.

The arrangement according to the invention is an arrangement for filling watering cans, having a container for receiving liquid, wherein the container is assigned a closable outlet and an in particular closable inlet. A constituent part of the arrangement is a container for receiving liquid, wherein the container is assigned a closable outlet and an in particular closable inlet. Via the inlet, the container can be filled even in the absence of a watering can. The outlet can be dimensioned such that quick filling of the watering can is possible. A common type of watering can has a volume of about 10 liters. Complete filling can take place with a sufficiently large outlet in about 10 seconds or less. The volume flow is then 1 liter per second or more. Filling takes place in a pressureless manner, that is to say only atmospheric pressure and no positive pressure bears down on the liquid column in the container.

According to a further concept of the invention, an effective cross section of the outlet is larger than an effective cross section of the inlet, in particular at least four times as large. Preferably, the outlet is ten times as large as the inlet or larger. A filled watering can is emptied slowly in the garden while the water flows into the container. If the watering can is empty, it can be filled again from the container in a very short period of time.

According to the invention, the inlet may be assigned a closure which automatically closes the inlet as soon as the liquid in the container has reached an upper liquid level or a defined quantity of liquid has flowed into the container. As a result, it is possible to connect the container to a water line that is always open, without the container overflowing.

Advantageously, the closure for the inlet is actuable by a float in the container. The principle for a closure, controlled by a float, of a water line is known from cisterns for toilets and does not need to be explained in more detail.

According to the invention, the inlet may be assigned a connection for a water line or a garden hose, in particular a plug-in coupling, preferably for a ½" or ¾" coupling. These are commercially customary coupling sizes for garden hoses. Of course, other sizes can also be used.

Alternatively, the inlet may also be connected to a downpipe for roof drainage (gutter) directly or via a line/hose. In this case, operation without a float is also possible, since the connection is pressureless. Finally, the connection to the downpipe may also be provided in addition to the connection for a garden hose or some other waterline.

According to a further concept of the invention, the outlet may be assigned a manually operable closure which has to be actuated only for the purpose of opening and closes again automatically, in particular after a defined quantity of liquid has run through, when the container is empty or after a defined period of time has elapsed. The principle of manual opening and automatic closing is likewise known from cisterns in toilets. As a result, operation is particularly easy.

Preferably, the outlet is assigned a siphon bell which closes an end opening or container opening and is liftable for the purpose of opening. The lifting of the siphon bell can take place manually via a linkage or a cable pull or by a change of pressure in the container or in some other way. The use of a siphon bell is again known in connection with cisterns for toilets.

The opening and closing of the outlet can take place in various ways, for example manually, pneumatically, hydraulically and/or electrically. Preferably, opening is carried out manually, while closing of the outlet takes place automatically after a defined quantity of liquid has run through, when the container is empty or after a defined period of time has elapsed. For the purpose of closing and optionally also for the purpose of opening, an electrically actuated valve can also be provided, in particular in conjunction with an electronic unit for control purposes. A time interval for example is stored in the electronic unit. The time interval starts when the outlet is opened. After the time interval has elapsed, the valve receives a signal for closing. Alternatively or in addition, a flow meter can be provided. Once a previously defined flow rate has been achieved, the valve receives a signal for closing.

According to the invention, the outlet may have an outflow nozzle which is configured in a curved manner such that a free nozzle opening is not located in a central upright container plane under the container but is located at a distance in front of the upright container plane. The height and width dimensions of the container define the upright container plane, which extends approximately centrally through the container. In this case, the container may have a relatively small depth (dimension perpendicular to the upright container plane). The depth may be smaller than the corresponding dimension of a watering can to be filled, on account of the curved outflow nozzle. The outflow nozzle is preferably arranged such that, while the watering can indeed stand underneath the container during filling, it is offset in an inclined manner with respect thereto, that is to say at a distance from the upright container plane. In this case, the outflow nozzle passes between the opening in the watering can and the curved handle thereof. The outlet is advantageously provided in the region of a lowest point of the container in order that no solids can accumulate in the container. Preferably, the outlet is arranged in a bottom wall of the container or in a side wall of the container close to the bottom wall.

According to a further concept of the invention, the arrangement may have securing means for securing to a wall. In the simplest case, holes are provided for suspending on hooks in the wall. However, height-adjustable securing means, for instance a rail having lockable slides arranged thereon, are also possible. Preferably, the slides are then assigned to the arrangement and the rail is assigned to the wall.

According to the invention, the container may be embodied as floor-standing model or a holder for the container may be provided, such that an outlet opening of the container, or a lower container opening, is arranged at a distance from the ground, in particular at a distance of about half a meter. The holder may be provided as a stand for standing on the ground or for leaning against and/or securing to a wall. The distance from the ground should be dimensioned such that a watering can provided for the arrangement can be positioned easily under the outlet opening.

Advantageously, the container functions according to the principle of a toilet cistern and is constructed in a corresponding manner, in particular with a float-controlled inlet and torrent-like emergence of the water.

A further subject of the invention is also an ensemble made up of an arrangement of the abovementioned type and a watering can, wherein the watering can has on its top side a filling opening, and wherein the arrangement is assigned a holding device which holds the container at a height such that an outlet opening on the container, or a lower container opening or a nozzle opening, is arranged approximately in the region of the opening for filling the watering can or thereabove. The aim is a distance of at most 1 to 2 centimeters. The watering can can then be positioned easily under the outlet opening and be moved away again after filling. Spray scarcely occurs.

BRIEF DESCRIPTION OF THE DRAWINGS

Further features of the invention can be gathered from the rest of the description and from the claims. Advantageous embodiments of the invention are explained in more detail in the following text with reference to drawings, in which:

FIG. 1 shows a lateral plan view of an arrangement for filling together with a watering can standing therebeneath, FIG. 2 shows a side view of the arrangement from FIG. 1, FIG. 3 shows a top view of the arrangement from FIG. 1, FIG. 7 shows a lateral plan view of a further embodiment of the arrangement, FIG. 8 shows a cross section of the arrangement along the line VIII-VIII in FIG. 7.

DETAILED DESCRIPTION OF PREFERRED EMBODIMENTS

Figure 4:
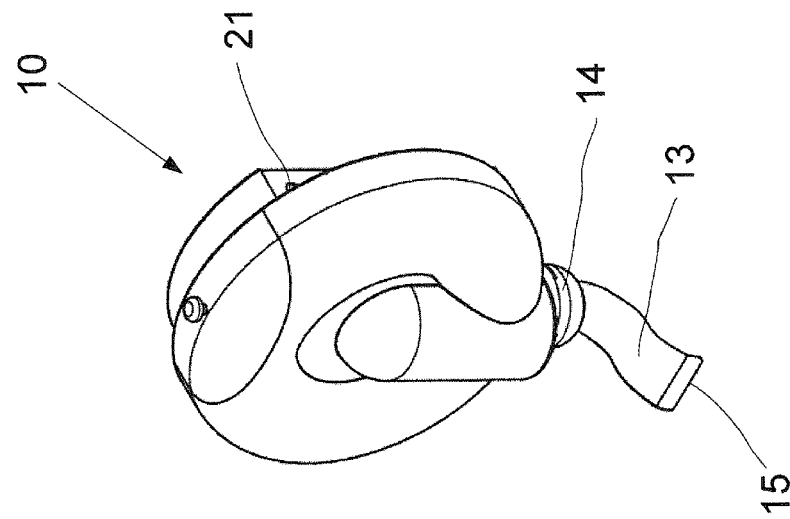
FIG. 4 shows a perspective illustration of an arrangement for filling watering cans.

A filling arrangement for watering cans has a container 10 for receiving water. The container 10 is intended to be secured to an upright wall (not shown), for instance to an outside wall of a house. To this end, the container 10 is formed in a relatively flat manner, specifically with a small depth, in relation to height and width. The height and width in this case define an upright container plane 11 which extends approximately centrally through a lower container opening 12.

An outflow nozzle 13 which is connected to the container opening 12 by way of a threaded flange 14 adjoins at the bottom of the container opening 12. The outflow nozzle 13 is configured in an elbowed manner with a free nozzle opening as the outlet opening beneath the container opening 12 and offset with respect to the container plane 11.

Beneath the container 10, a watering can 16 is positioned on a stand 17. On its side, the watering can has a spout pipe 18 and, above a top side 19, a handle 20. Underneath the handle 20, the top side 19 is provided with an opening which is not visible in the figures. The watering can 16 is positioned on the stand 17 such that the nozzle opening 15 is directed precisely into the opening in the top side 19. Accordingly, the watering can 16 does not stand in the upright container plane 11 but in front of the latter, see in particular FIG. 2.

In its upper region, the container 10 has on its side a connection 21, specifically a plug connection for connecting a garden hose. Provided in a manner not shown in the interior of the container 10 is a closure for the connection 21 that acts as an inflow, in particular in conjunction with a float, such that the connection 21 closes automatically as soon as a defined water level has been reached in the container 10.

The watering can 16 is filled like the water inlet in the case of a toilet cistern. The container 10 is filled relatively slowly from a garden hose. On account of the automatic closure in the region of the connection 21, the garden hose can remain attached. The supply of water does not have to be turned off.

Figure 5:
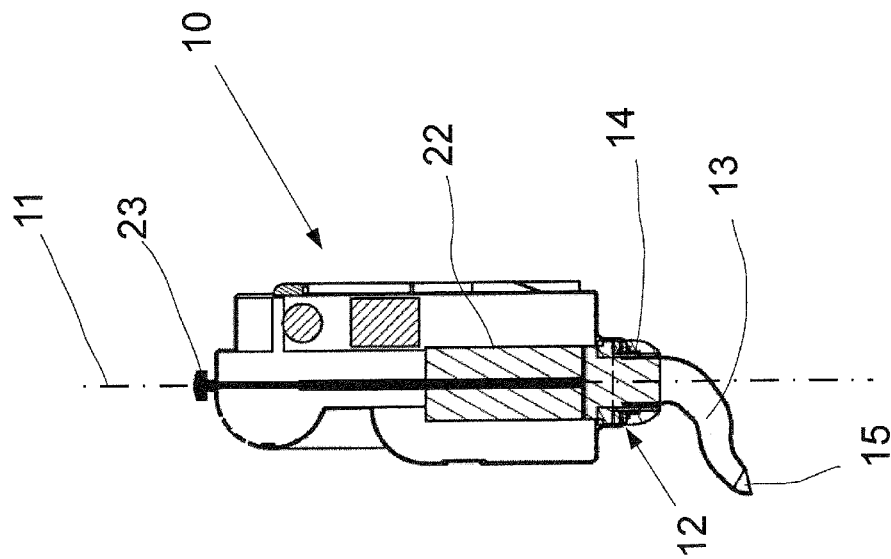
FIG. 5 shows a lateral plan view of the arrangement according to FIG. 4.
Figure 6:
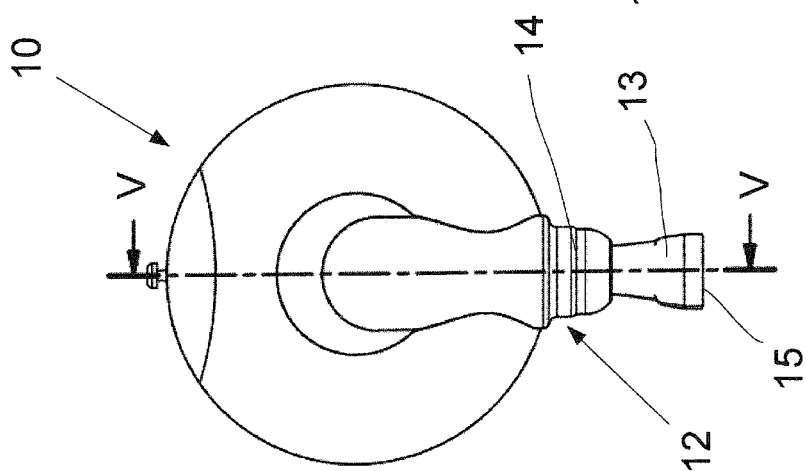
FIG. 6 shows a cross section of the arrangement along the line VI-VI in FIG. 5.

In order to let the water out of the container 10, two variants are shown in the figures, specifically FIGS. 4 to 6 for one and FIGS. 7 to 8 for the other. In both variants, the lower container opening is closed by a siphon bell 22 and, in order to let out the water, the siphon bell 22 has to be lifted. According to FIGS. 4 to 6, a linkage having a pull lever 23 is provided for this purpose. By contrast, FIG. 8 shows a push button 24 by way of which a pressure change is briefly generated in the container 10 such that the siphon bell 22 is briefly lifted as a result or a stored water volume is discharged in some other way.

By way of the pull lever 23 or the push button 24, the lower container opening 12 is opened and the container contents pour in a torrent into the watering can 16 through the outflow nozzle 13. The cross sections of the outflow nozzle 13 and the container opening 12 are dimensioned in a relatively large manner with respect to the connection 21, so that approximately 0.5 to 2 liters per second of water can flow out, even more in the case of larger cross sections. With a container content of 8 to 10 liters, a conventional 1-liter watering can can be filled with a torrent of water for example within 10 seconds.

LIST OF REFERENCE SIGNS

10 Container
11 Upright container plane
12 Lower container opening
13 Outflow nozzle
14 Threaded flange
15 Nozzle opening
16 Watering can
17 Stand
18 Spout pipe
19 Top side
20 Handle
21 Connection
22 Siphon bell
23 Pull lever
24 Push button

What is claimed is:

1. An arrangement for filling watering cans, comprising a container for receiving liquid, wherein the container comprises a closable outlet and a closable inlet, wherein:

the outlet comprises an opening in a bottom wall of the container with the opening being in an upright container plane and in the region of a lowest point of the container;

the outlet comprises an outflow nozzle connected to the opening in the bottom wall of the container at a first end and having a free nozzle opening at a second end;

the outflow nozzle is configured in a curved manner wherein the free nozzle opening is not located in the upright container plane under the container but is located at a distance in front of the upright container plane; and the outlet further comprises a manually operable closure manually actuatable only for the purpose of opening and closes again automatically, wherein the container functions and is constructed according to the principle of a toilet cistern, wherein the opening is manually opened by a means selected from the group consisting of a pull lever arranged in the upright container plane and a push button arranged in front of the upright container plane, the opening automatically closes, and the inlet is float-controlled.

2. The arrangement according to claim 1, wherein an effective cross section of the outlet is larger than an effective cross section of the inlet.

3. The arrangement according to claim 2, wherein the inlet comprises a closure which automatically closes the inlet as soon as the liquid in the container has reached an upper liquid level or a defined quantity of liquid has flowed into the container.

4. The arrangement according to claim 3, wherein the closure for the inlet is actuable by a float in the container.

5. The arrangement according to claim 2, wherein the effective cross section of the outlet is at least four times as large as the effective cross section of the inlet.

6. The arrangement according to claim 1, wherein the inlet comprises a closure which automatically closes the inlet as soon as the liquid in the container has reached an upper liquid level or a defined quantity of liquid has flowed into the container.

7. The arrangement according to claim 6, wherein the closure for the inlet is actuable by a float in the container.

8. The arrangement according to claim 1, wherein the inlet further comprises a connection for a water line or a garden hose.

9. The arrangement according to claim 8, wherein the connection is a plug-in coupling.

10. The arrangement according to claim 9, wherein the coupling is a ½" or ¾" coupling.

11. The arrangement according to claim 1, wherein the outlet further comprises a siphon bell which closes an end opening or container opening and is liftable for the purpose of opening.

12. The arrangement according to claim 1, further comprising securing means for securing the arrangement to a wall.

13. The arrangement according to claim 1, wherein the container is embodied as floor-standing model wherein at least one of the outlet opening, a lower container opening, and a nozzle opening, is arranged at a distance from the ground.

14. The arrangement according to claim 13, wherein the distance from the ground is about 0.5 meter.

15. A system comprising:
a) an arrangement for filling watering cans, comprising a container for receiving liquid, wherein the container comprises a closable outlet and a closable inlet, wherein:
the outlet comprises an opening in a bottom wall of the container with the opening being in an upright container plane and in the region of a lowest point of the container;
the outlet comprises an outflow nozzle connected to the opening in the bottom wall of the container at a first end and having a free nozzle opening at a second end;
the outflow nozzle is configured in a curved manner wherein the free nozzle opening is not located in the upright container plane under the container but is located at a distance in front of the upright container plane; and
the outlet further comprises a manually operable closure manually actuatable only for the purpose of opening and closes again automatically,
wherein the container functions and is constructed according to the principle of a toilet cistern, wherein the opening is manually opened by a means selected from the group consisting of a pull lever arranged in the upright container plane and a push button arranged in front of the upright container plane, the opening automatically closes, and the inlet is float-controlled; and
b) a watering can, wherein the watering can has on its top side a filling opening, and wherein the arrangement comprises a holding device which holds the container at a height such that the free nozzle opening is arranged approximately at or above the opening for filling the watering can.

16. The arrangement according to claim 1, wherein the closure closes automatically upon the occurrence of one of the following: after a defined quantity of liquid has emerged; when the container is empty; and after a defined period of time has elapsed.

17. The arrangement according to claim 1, further comprising a holder for the container, wherein at least one of the outlet opening, a lower container opening, and a nozzle opening, is arranged at a distance from the ground.

18. The arrangement according to claim 17, wherein the distance from the ground is about 0.5 meter.

19. An arrangement for filling watering cans, comprising a container for receiving liquid, wherein the container comprises a closable outlet and a closable inlet, wherein:
the outlet comprises an opening in a bottom wall of the container with the opening being in an upright container plane and in the region of a lowest point of the container;
the outlet comprises an outflow nozzle connected to the opening in the bottom wall of the container at a first end and having a free nozzle opening at a second end;
the outlet further comprises a siphon bell which closes an end opening or container opening and is liftable for the purpose of opening; and
the outflow nozzle is configured in a curved manner wherein the free nozzle opening is not located in the upright container plane under the container but is located at a distance in front of the upright container plane.

20. An arrangement for filling watering cans, comprising a container for receiving liquid, wherein the container comprises a closable outlet and a closable inlet, wherein:

the outlet comprises an opening in a bottom wall of the container with the opening being in an upright container plane and in the region of a lowest point of the container;

the outlet comprises an outflow nozzle connected to the opening in the bottom wall of the container at a first end and having a free nozzle opening at a second end;

the outlet further comprises a manually operable closure manually actuatable only for the purpose of opening and closes again automatically;

the outlet further comprises a siphon bell which closes an end opening or container opening and is liftable for the purpose of opening; and the outflow nozzle is configured in a curved manner wherein the free nozzle opening is not located in the upright container plane under the container but is located at a distance in front of the upright container plane, wherein the container functions and is constructed according to the principle of a toilet cistern, wherein the opening is manually opened by a means selected from the group consisting of a pull lever arranged in the upright container plane and a push button arranged in front of the upright container plane, the opening automatically closes, and the inlet is float-controlled.

* * * * *